(12) United States Patent
Guldenfels

(10) Patent No.: US 6,382,404 B1
(45) Date of Patent: May 7, 2002

(54) CORRUGATED FLIGHT MODULE

(75) Inventor: Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 09/745,630

(22) Filed: Dec. 21, 2000

(51) Int. Cl.⁷ .............................................. B65G 17/06
(52) U.S. Cl. ..................... 198/850; 198/853; 198/699.1
(58) Field of Search ............... 198/699.1, 730, 198/734, 850, 851, 853

(56) References Cited

U.S. PATENT DOCUMENTS

| | | | |
|---|---|---|---|
| 2,774,460 A | 12/1956 | Spoonhour | 198/131 |
| 2,856,064 A | 10/1958 | De Windt | 198/198 |
| 2,884,935 A | 5/1959 | Fox | 134/72 |
| 3,245,518 A | 4/1966 | Reibel et al. | 198/198 |
| 3,269,523 A | 8/1966 | Creswell | 198/176 |
| 3,288,271 A | 11/1966 | Burford | 198/131 |
| 3,750,864 A | 8/1973 | Nolte | 198/201 |
| 3,870,141 A | 3/1975 | Lapeyre et al. | 198/193 |
| 3,921,376 A | 11/1975 | Hofer | 56/400 |
| 4,109,784 A | 8/1978 | Hartmann | 198/821 |
| 4,170,281 A | 10/1979 | Lapeyre | 198/844 |
| 4,213,527 A | 7/1980 | Lapeyre et al. | 198/853 |
| D293,037 S | 12/1987 | Capawana | D34/35 |
| 4,729,469 A | 3/1988 | Lapeyre et al. | 198/834 |
| 4,989,718 A | 2/1991 | Steeber | 198/347.3 |
| 5,020,656 A | 6/1991 | Faulkner | 198/494 |
| 5,050,728 A | 9/1991 | Dimmer | 198/844.2 |
| 5,143,203 A | 9/1992 | Hinner | 198/708 |
| 5,165,514 A | 11/1992 | Faulkner | 198/347.3 |
| 5,165,522 A | 11/1992 | Uttke et al. | 198/716 |
| 5,333,723 A | 8/1994 | Rich | 198/484.1 |
| 5,413,211 A | 5/1995 | Faulkner | 198/690.2 |
| 5,469,956 A | 11/1995 | Greve et al. | 198/699.1 |
| 5,490,591 A | 2/1996 | Faulkner | 198/803.13 |
| 5,660,266 A | 8/1997 | Nolte | 198/711 |
| 5,967,296 A | * 10/1999 | Dolan | 198/853 |
| 5,975,283 A | 11/1999 | Riffe | 198/607 |

* cited by examiner

Primary Examiner—James R. Bidwell
(74) Attorney, Agent, or Firm—Hodgson Russ LLP

(57) ABSTRACT

A flight module for use in a modular conveying belt for holding material on a moving belt. The module includes an intermediate portion having an upstanding wall that extends therefrom. The upstanding wall is corrugated in a direction transverse to the direction of belt travel. A first plurality of link ends extend outwardly from the intermediate portion and have openings defined therein that are transverse to the direction of belt travel. A second plurality of link ends extend outwardly from the intermediate portion in a direction opposite to the first plurality of link ends. The second plurality of link ends also have openings defined therein that are transverse to the direction of belt travel. The link ends are arranged such that the openings in respective link ends are capable of aligning when a pair of adjacent belt modules are juxtaposed. A pivot rod journaled in the aligned apertures of the side-by-side and end-to-end connected modules forms a hinge between adjacent rows. Rows of belt modules are connected together to form an endless conveyor belt capable of articulating about a drive sprocket.

11 Claims, 9 Drawing Sheets

US 6,382,404 B1

CORRUGATED FLIGHT MODULE

FIELD OF INVENTION

The present invention relates to modular conveyor belts and more specifically to modular conveying belts having upstanding flights for holding material on a moving belt.

BACKGROUND OF THE INVENTION

Upstanding flights for holding material on a modular conveyor belt are typically formed with either flat planar surfaces or with vertical ribs. The flat planar surfaces have some drawbacks including the fact that wet particles tend to cling to the flat surfaces. In order to prevent the conveyed items from clinging to the flight modules, vertical ribs have been added to the planar flights. The vertical ribs prevent wet food particles such as sliced carrots from sticking to the flights. However, these type of flights have been harder to clean because of the corners created by the ribs. Particles may become trapped in the corners created by the ribs and may resist being removed by sprayed water.

Another consideration in the design of upstanding flight modules is that the flights must have sufficient strength to withstand relatively heavy impacts associated with the loading of the materials to be conveyed onto the belt.

Finally, the surface of the flight module must also be easy to clean so that it is suitable for conveying food items and the like.

There have been many attempts at providing upstanding flights for holding material on a moving modular belt. U.S. Pat. No. 4,832,183 to Lapeyre relates to an endless loop conveyor belt 22 having a module 36 with a conveying member 39. The top side of each module 36 defines an area for attaching a conveying member 39 and the conveying member 39 has a bottom side or attaching portion 72 which cooperates with the area 74 on the top side of the base member 37 of module 36. As shown in FIGS. 20A to 20C, the conveying members may include openings, vertical pins and spikes.

U.S. Pat. No. 4,213,527 to Lapeyre et al. describes a chain link conveyor comprising interlinked modules. FIG. 11 shows a flight module having a vertically undulated surface useful for picking up both processed fruit and conveying it along the conveyor. The undulated surface is described as preventing the fruit from sticking to the module.

U.S. Pat. No. 5,490,591 to Faulkner relates to an endless loop conveyor formed of interlinked modules. FIGS. 10 and 11 show the use of a reversed-bend cleat having a product-carrying surface 76 and a product-releasing surface 80.

U.S. Pat. No. 5,165,514 to Faulkner describes conveyor belt modules comprising flight projection 40 having a forward face 50 and a rearward face 52 and first and second end connectors 54, 56. The connectors 54, 56 cooperate with those on an adjacent module to maintain alignment of the faces in side-by-side flights.

U.S. Pat. No. 2,884,935 to Fox relates to a conveyor type dishwasher having upstanding fingers 76.

Despite these efforts, there remains a need for an upstanding flight module having a shape that provides high strength/rigidity relative to its weight (thereby reducing manufacturing costs and improving performance), that is easy to clean, and that prevents the items being conveyed from sticking to the surface of the flights.

SUMMARY OF THE INVENTION

The present invention meets the above-described need by providing a flight module for use in a modular conveying belt. The module includes an intermediate portion having an upstanding wall that extends therefrom. The upstanding wall is corrugated in a direction transverse to the direction of belt travel. The corrugation provides rigidity to withstand impacts from either the top or the front of the module. The rigidity and impact resistance of the flight modules provides strength for loading material onto the belts. Also, the corrugation provides for equal strength at a reduced thickness in comparison to other flight modules. Accordingly, the corrugated design reduces the material costs associated with manufacturing the flight modules. The corrugated shape of the flight modules also eliminates the flat surfaces that are associated with straight-wall designs and that create problems with wet particles clinging to the flat surfaces. Finally, since the corrugated flights have all smooth and rounded surfaces they are easier to clean than the ribbed flights.

In one embodiment of the invention, a first plurality of link ends extend outwardly from the intermediate portion and have openings defined therein that are transverse to the direction of belt travel. A second plurality of link ends extend outwardly from the intermediate portion in a direction opposite to the first plurality of link ends. The second plurality of link ends also have openings defined therein that are transverse to the direction of belt travel. The link ends are arranged such that the openings in respective link ends are capable of aligning when a pair of adjacent belt modules are juxtaposed. A pivot rod journaled in the aligned apertures of the side-by-side and end-to-end connected modules forms a hinge between adjacent rows. Rows of belt modules are connected together to form an endless conveyor belt capable of articulating about a drive sprocket.

The present invention may be used with open grid belts or flat belts. Also, the flight modules of the present invention may be used with both straight-running and radius belts.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
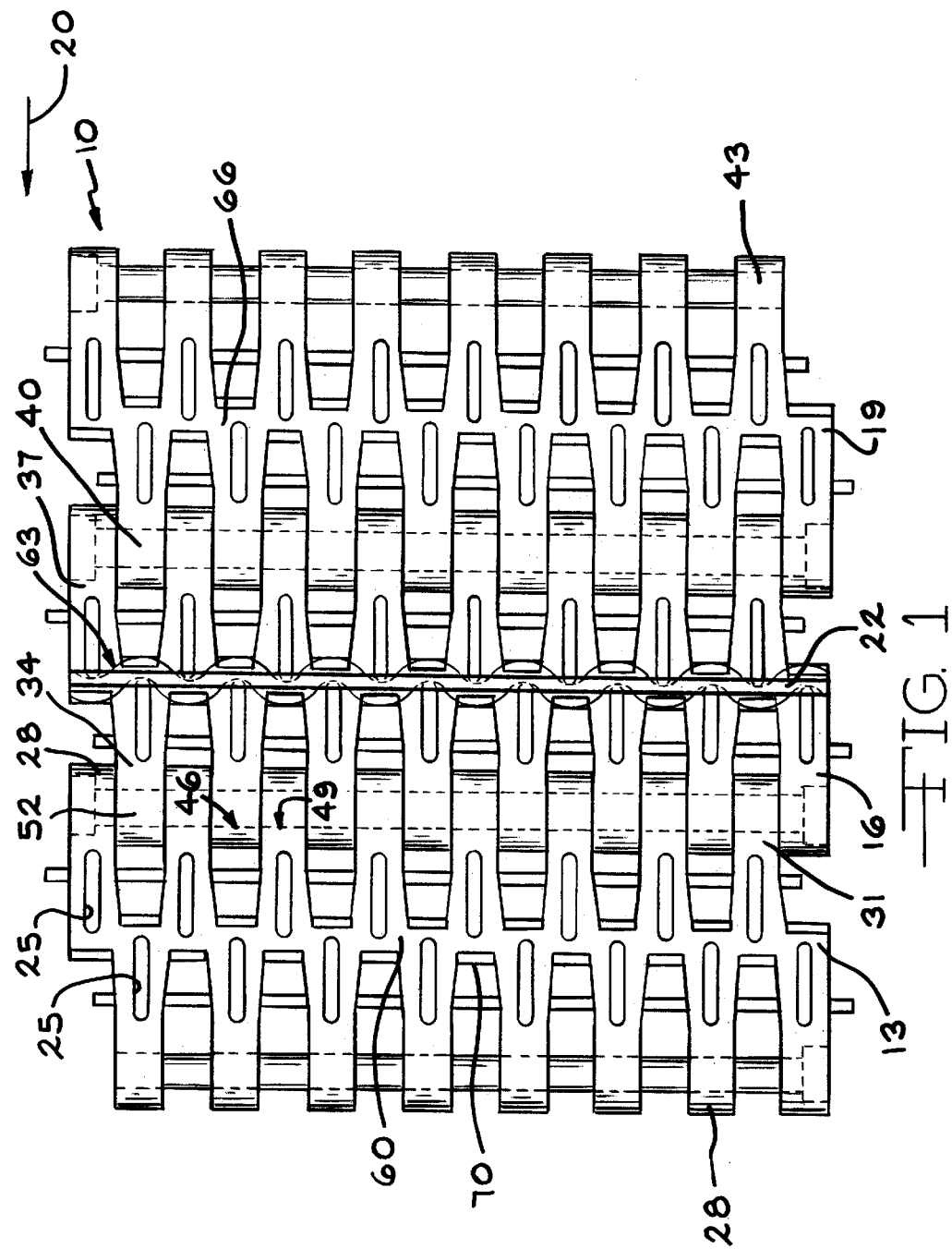
FIG. 1 is a top plan view of a modular conveying belt containing a flight module of the present invention.

Referring to FIGS. 1–10, and initially to FIG. 1, a modular conveying belt 10 is formed from the juxtaposition of belt modules 13, 16, and 19. For reference purposes, the direction of belt travel is indicated by arrow 20, however, the belt 10 of the present invention may also travel in the opposite direction. Module 16 is commonly referred to as a flight module. An upstanding wall or flight 22 holds the materials (not shown) that are being conveyed on the moving belt 10 to prevent them from slipping. The module 16 of the present invention has vertical openings 25 for use in an open grid style belt. The belt modules 13, 16, and 19 are preferably manufactured from plastic or other materials suitable for use with the conveying of food items. The plastic modules are preferably thermoformed through a plastic molding process as known to those of ordinary skill in the art. Plastic belts are relatively inexpensive, easy to clean and durable. Also, because they do not corrode and are light-weight, they are used widely, especially in conveying food products. The modules 13, 16, and 19 shown in FIG. 1 are arranged in end-to-end fashion to form the belt 10. The individual modules 13, 16, or 19 can also be placed alongside like modules to form belts 10 of varying widths.

With reference to the orientation of FIG. 1, a plurality of first link ends 28 are disposed on the left hand side of module 13 and a plurality of second link ends 31 are disposed on the right hand side of module 13. Similarly, module 16 also includes a plurality of first link ends 34 and a plurality of second link ends 37. Finally, module 19 also includes a plurality of first link ends 40 and a plurality of second link ends 43 in the same orientation.

With reference to module 13, the second link ends 31 have a plurality of apertures 46 defined therein. The apertures 46 are capable of aligning with apertures 49 disposed in the first plurality of link ends 34 disposed on the adjacent module 16. A pivot rod 52 shown in phantom lines is capable of being journaled in the aligned apertures of the end-to-end connected modules 13 and 16 and forms a hinge between adjacent rows. Rows of belt modules 13, 16, and 19 are connected together to form an endless conveyor belt 10 capable of articulating about a drive sprocket (not shown).

Modules 13, 16, and 19 have intermediate sections 60, 63, and 66, respectively. The intermediate sections 60 and 66 corresponding to modules 13 and 19 extend transverse to the direction 20 of belt travel. Modules 13 and 19 do not have an upstanding wall or flight 20. The intermediate sections 60 and 66 for these modules are substantially flat and are defined by substantially straight walls 70 between successive link ends. In contrast, the intermediate section 63 disposed on module 16 contains the upstanding wall or flight 22. The upstanding wall 22 is disposed substantially perpendicular to a planar surface defined by the belt modules 13, 16, and 19.

Figure 2:
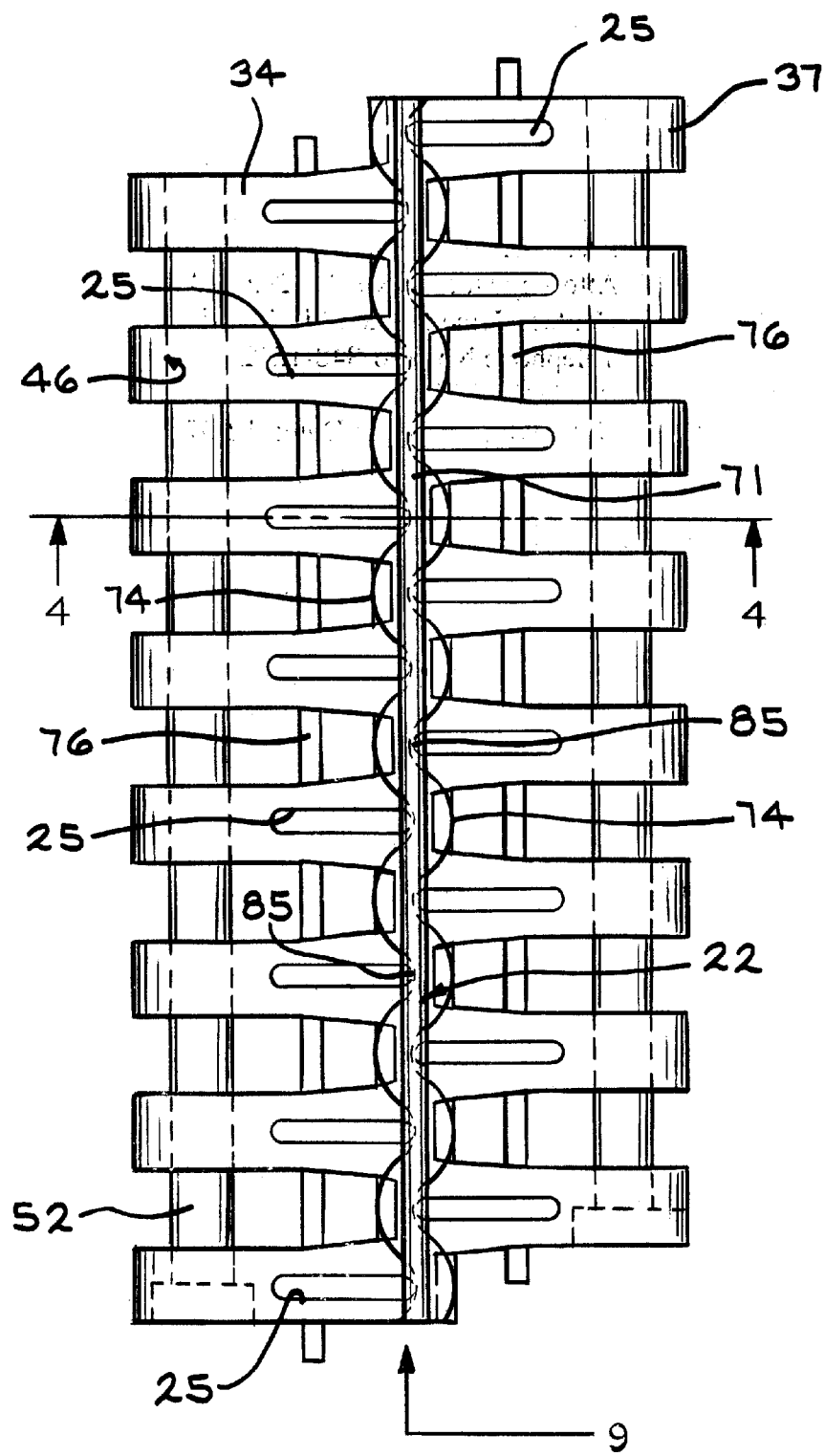
FIG. 2 is a top plan view of a flight module of the present invention.
Figure 3:
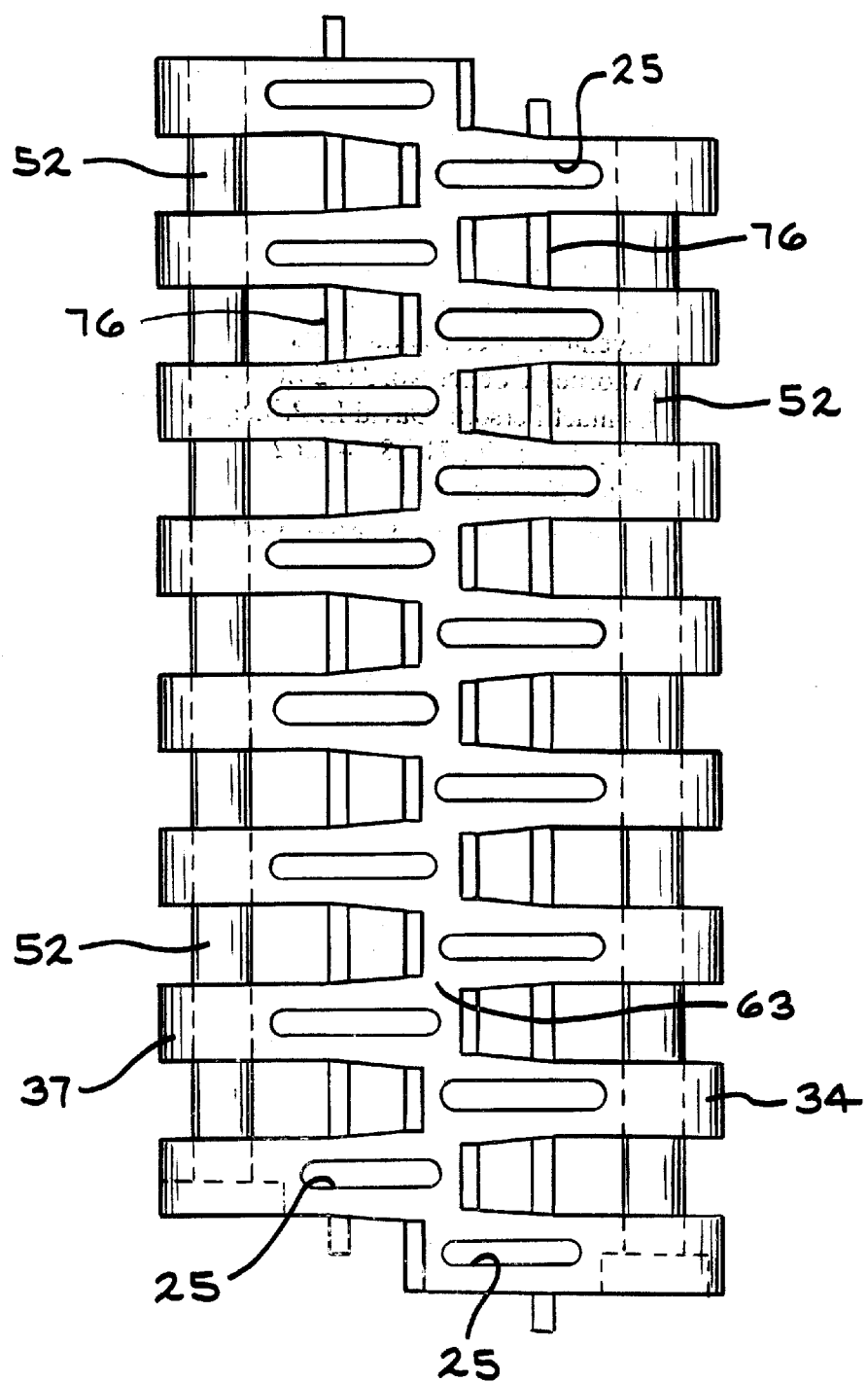
FIG. 3 is a bottom plan view of the flight module.

In FIGS. 2–3, belt module 16 is isolated and the upstanding wall or flight 22 is shown in greater detail. The flight 22 has a middle section 71 that is substantially straight. The flight 22 also has a plurality of curved sections 74 that form a corrugated shape.

Stabilizer bars 76 are connected between the link ends to provide stability. The bars 76 are disposed toward the intermediate section such that adjacent link ends have clearance to intercalate.

Figure 4:
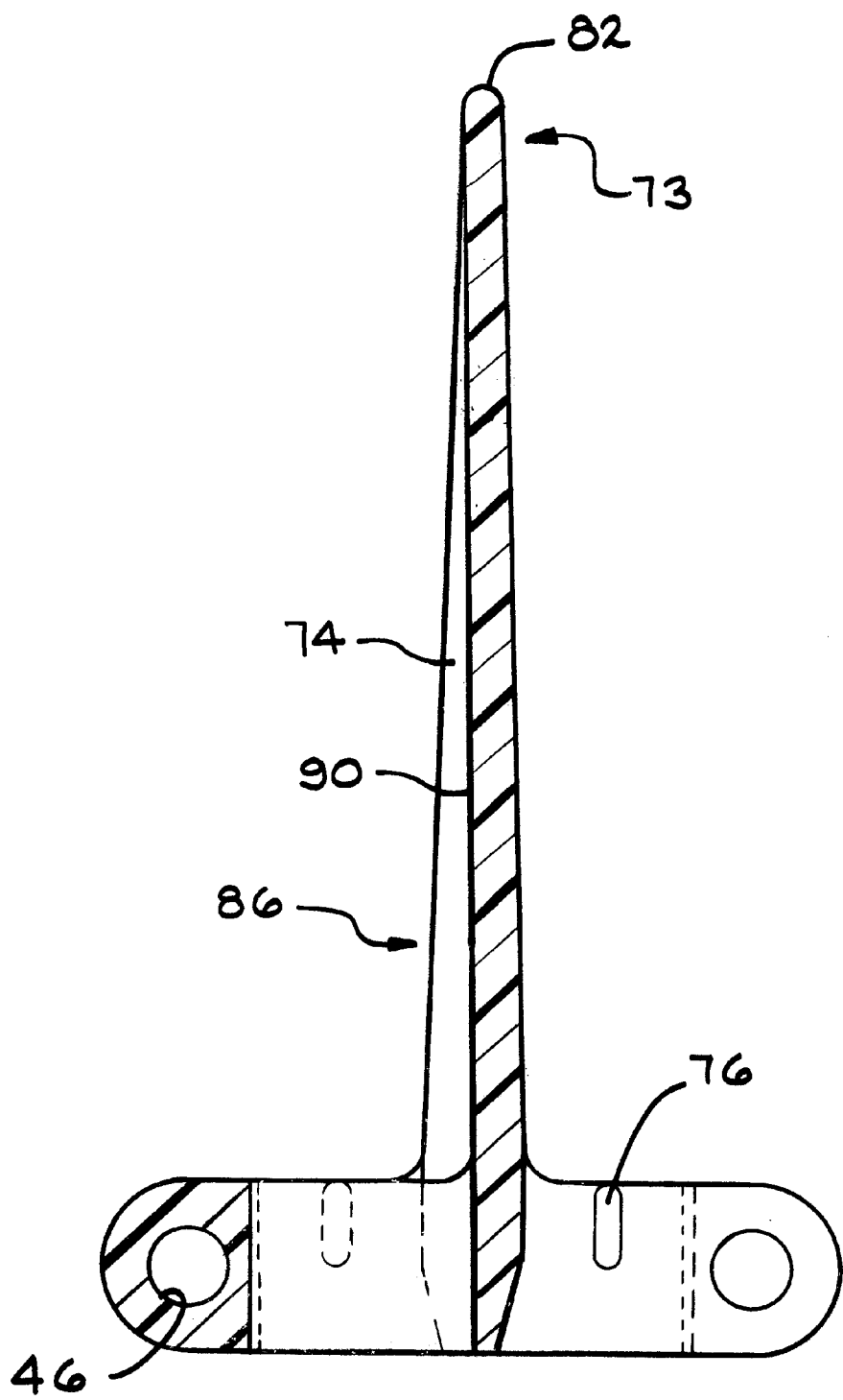
FIG. 4 is a cross-sectional view taken along lines 4—4 of FIG. 2.
Figure 5:
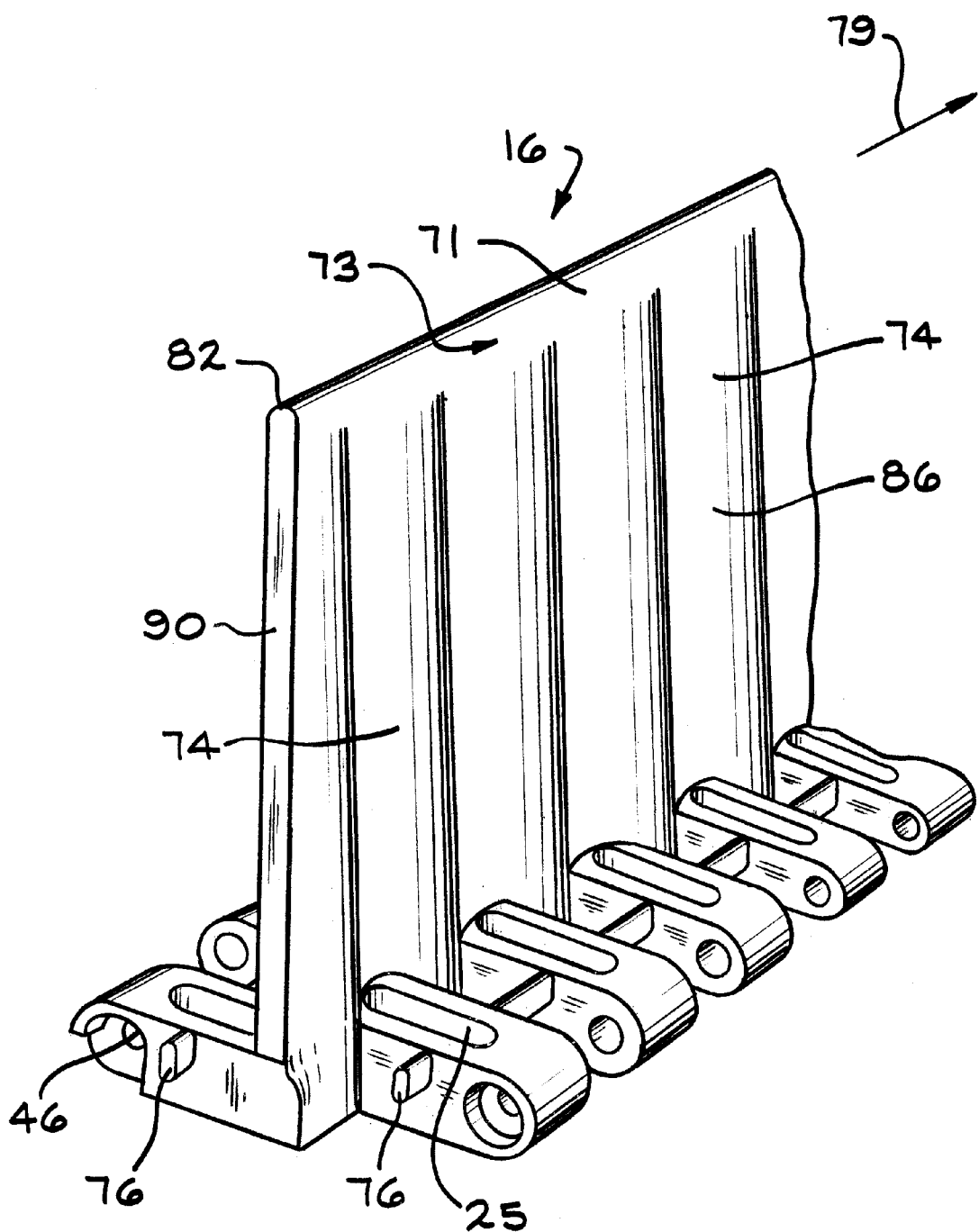
FIG. 5 is a partial perspective view of the flight module.
Figure 6:
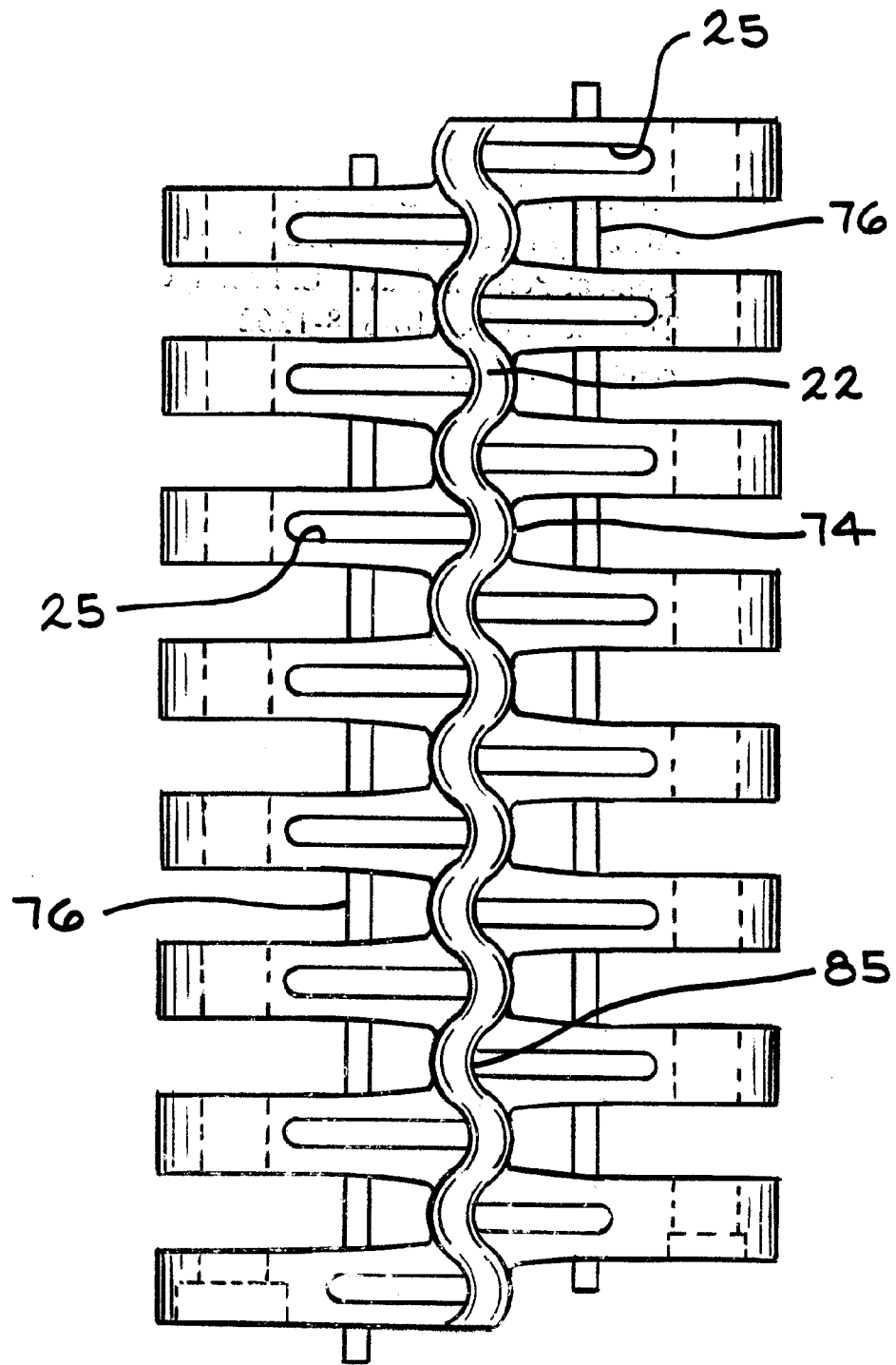
FIG. 6 is a top plan view of an alternate embodiment of the flight module of the present invention.
Figure 7:
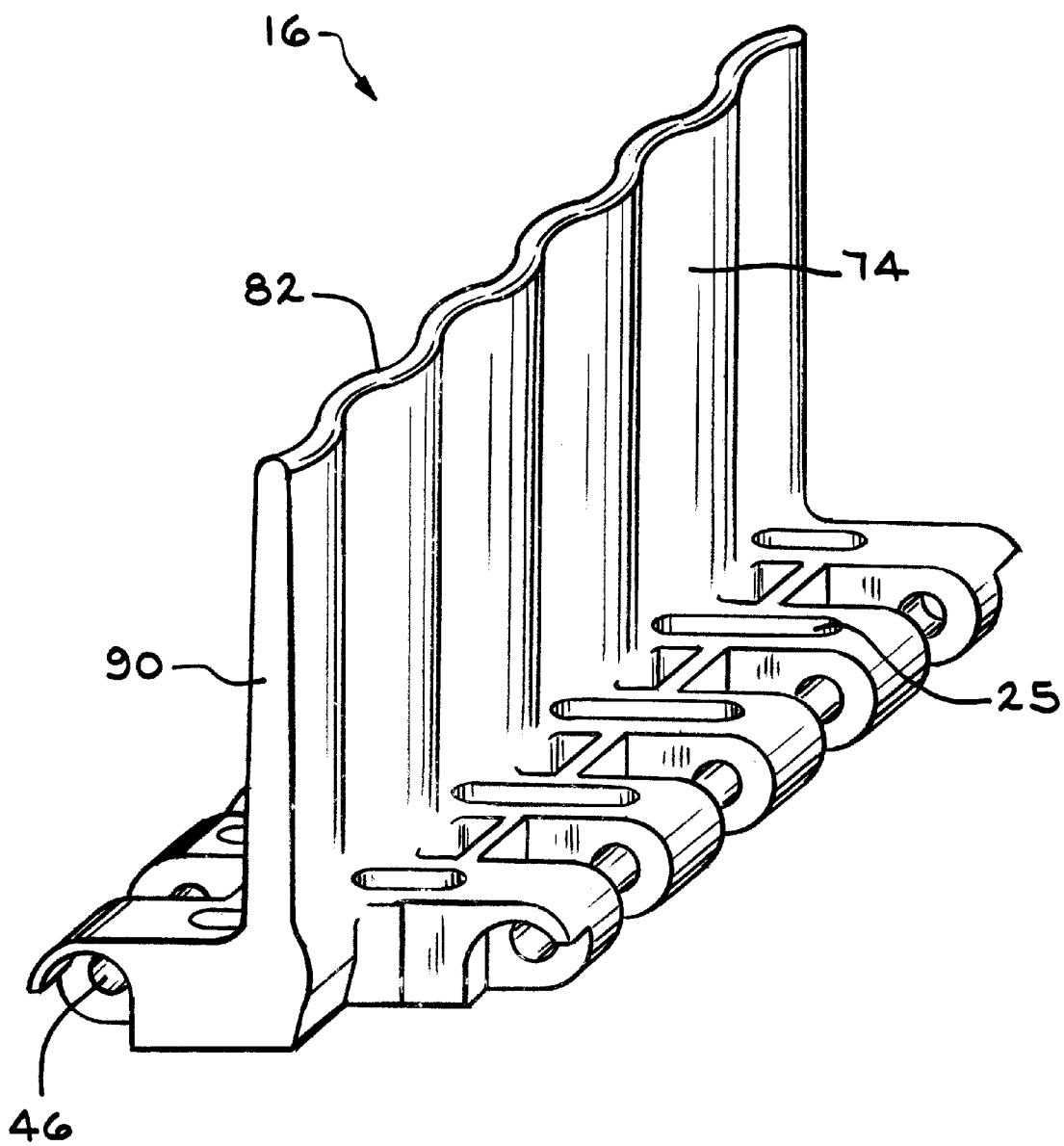
FIG. 7 is a perspective view of the flight module shown in FIG. 6.

With reference to FIGS. 4–5, a top wall portion 73 of the middle section 71 is approximately straight along a longitudinal axis 79 that is disposed perpendicular to the direction of belt travel. The top edge 82 of the flight 22 is rounded. Other shapes for the top of the flight 22 may also be suitable. As shown in FIGS. 6–7 for straight-running belt modules and in FIGS. 8–10 for radius belt modules, the straight middle section 71 is not required and as best shown in FIG. 7 the curved sections 74 of the flight 22 may extend all the way to the top surface 82 of the flight 22. Returning to FIG. 5, the lower wall portion 86 has a corrugated shape as shown in FIGS. 2 and 5. As shown in FIG. 2, the wall portion 76 alternates between edges 85 of the respective vertical openings 25.

In FIG. 4 the corrugated flight 22 is shown in cross-section. As shown, the flight 22 includes a vertical wall 90 having the curved section 74 that is corrugated such that section 74 curves inward and outward alternating between concave and convex.

Figure 8:
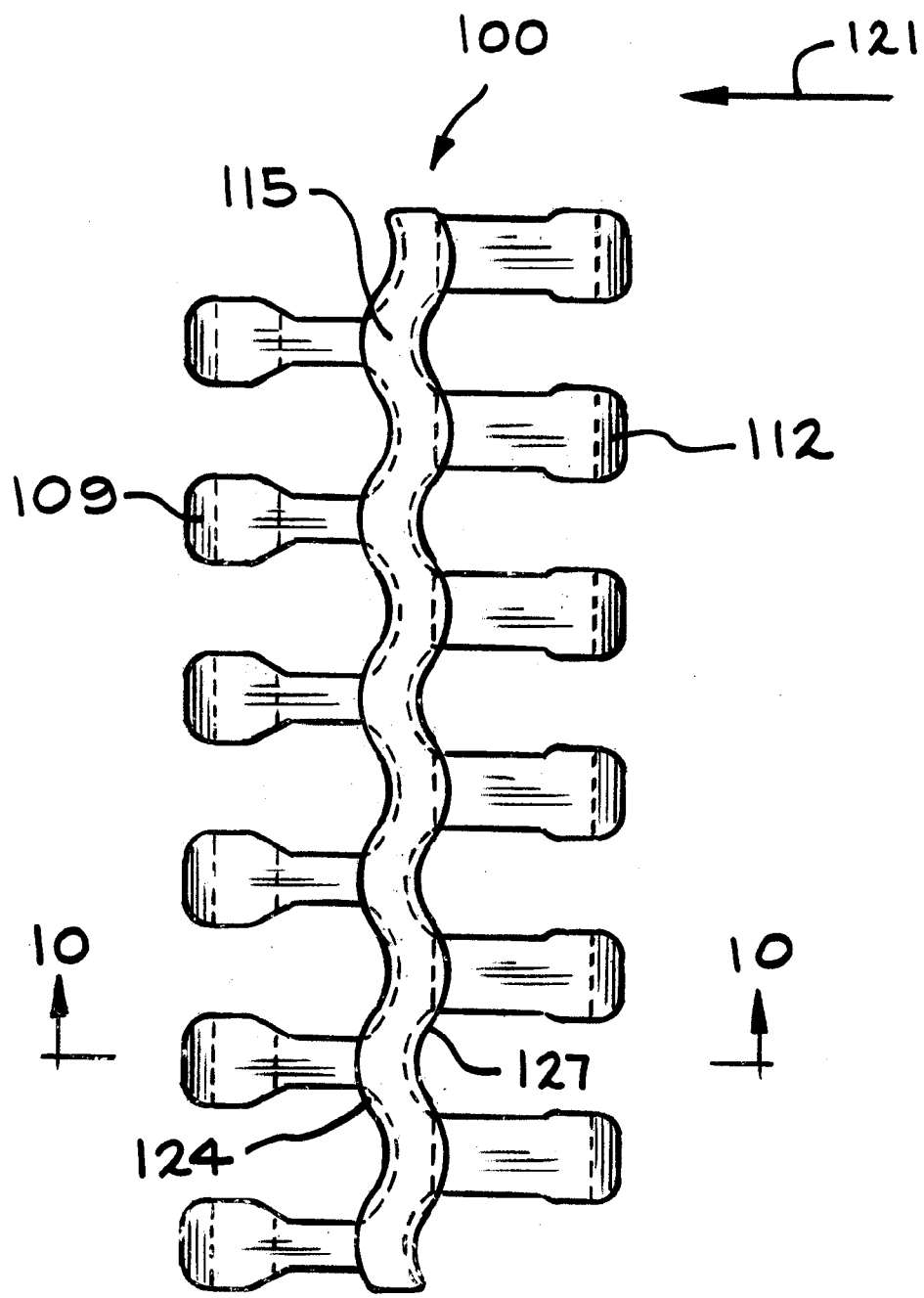
FIG. 8 is a top plan view of an alternate embodiment of the flight module for use with a radius belt.
Figure 9:
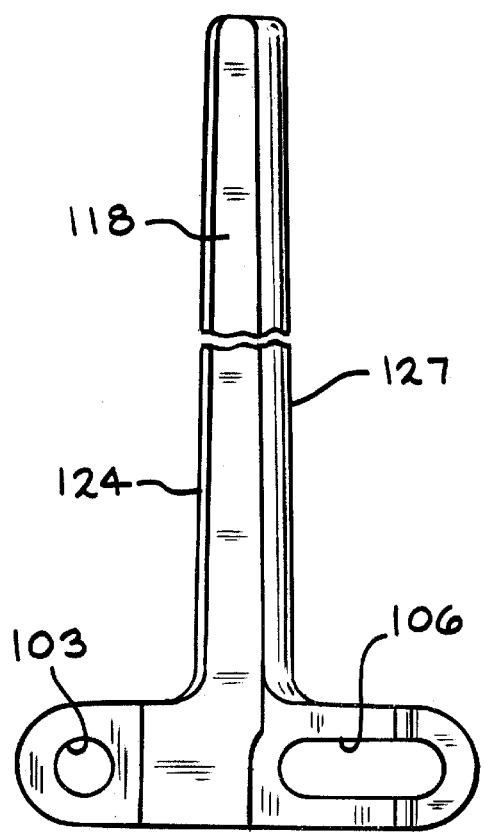
FIG. 9 is an end view of the flight module of FIG. 8.
Figure 10:
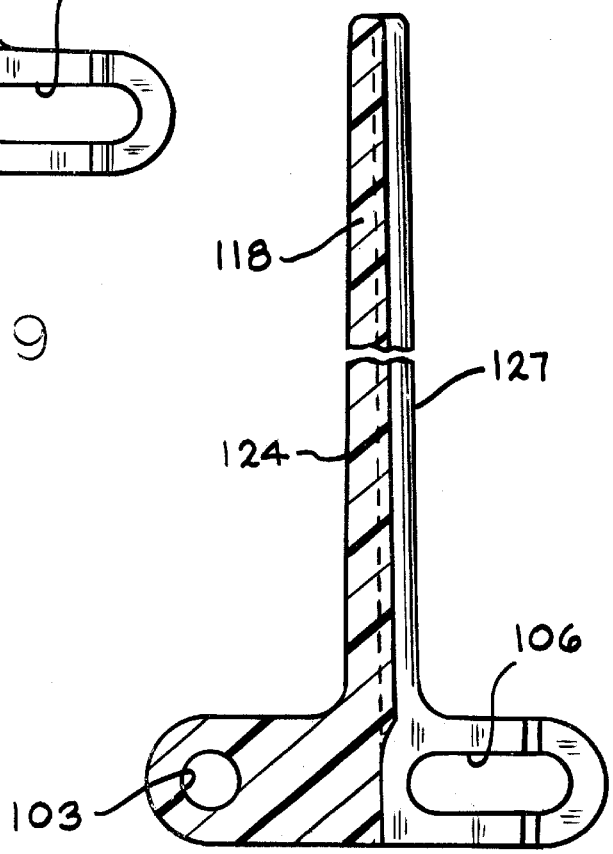
FIG. 10 is a cross-sectional view taken along lines 10—10 of FIG. 8.

In FIGS. 8–10, an alternate embodiment of the present invention comprises a belt module 100 suitable for use in a radius belt (not shown) capable of following a curved path. As known to those of ordinary skill in the art, a radius belt has round openings and elongated openings that allow adjoining belt modules to collapse or to fan out depending on which way the belt turns. Accordingly, the side of the belt on the inside of the curve collapses and the side of the belt on the outside of the curve fans out. Belt module 100 has a round opening 103 and an elongated slot 106 (FIG. 9). The slot 106 is elongated in the direction of belt travel.

The belt module 100 also includes a first set of link ends 109 and a second set of link ends 112 connected by an intermediate section 115. The second set of link ends 112 are disposed on the opposite side of the intermediate section 115 from the first set of link ends 109. The intermediate section 115 includes a vertical flight 118 (best shown in FIGS. 9 and 10). The vertical flight 118 is curved in corrugated fashion along a longitudinal axis of the link module 100 that is disposed transverse to the direction of belt travel indicated by arrow 121. The flight 118 includes a pair of opposed curved surfaces 124 and 127 that form an alternating or corrugated pattern.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A flight module for use in an endless modular conveying belt capable of articulating about a sprocket in a direction of belt travel, comprising:
    an intermediate portion having an upstanding wall extending therefrom, the upstanding wall being corrugated in a direction transverse to the direction of belt travel;
    a first plurality of link ends extending outwardly from the intermediate portion and having openings transverse to the direction of belt travel defined therein; and,
    a second plurality of link ends extending outwardly from the intermediate portion in a direction opposite to the first plurality of link ends and having openings transverse to the direction of belt travel defined therein.

2. The flight module of claim 1, wherein the module further comprises vertical openings defined therein.

3. The flight module of claim 1, wherein the module has a flat, solid top surface.

4. The flight module of claim 1, wherein at least one of the openings is elongated in the direction of belt travel such that the flight module is capable of being intercalated into a modular belt for use with a curved pathway.

5. The flight module of claim 1, wherein the corrugated portion is disposed between the intermediate portion and a substantially straight portion disposed on the upstanding wall at the side opposite from the intermediate portion.

6. The flight module of claim 1, wherein the intermediate portion has a beveled section capable of engaging with the sprocket.

7. A modular conveying belt capable of articulating about a sprocket in a direction of belt travel, the modular conveying belt, comprising:

a plurality of belt modules having an intermediate portion and having a plurality of first link ends extending outwardly from the intermediate portion in the direction of belt travel and having a plurality of second link ends extending outwardly from the intermediate portion in the opposite direction, the first and second link ends having openings transverse to the direction of belt travel defined therein;

at least one flight module having an intermediate section that is corrugated in a direction transverse to the direction of belt travel and having a plurality of first link ends extending outwardly from the intermediate portion in the direction of belt travel and having a plurality of second link ends extending outwardly from the intermediate portion in the opposite direction, the first and second link ends having openings transverse to the direction of belt travel defined therein;

a pivot rod extending transverse to the direction of belt travel through the openings in the first link ends of one of the plurality of belt modules and extending through the openings in the second link ends of an adjacent belt module such that the first and second link ends of the adjacent belt modules are intercalated into adjacent hinged rows.

8. The modular conveying belt of claim 7, wherein the belt modules and the flight module have flush grid openings.

9. The modular conveying belt of claim 7, wherein the belt modules and the flight module are flat top.

10. The modular conveying belt of claim 7, wherein one of the openings in the link ends is slotted in the direction of belt travel so that the modular conveying belt is capable of following a curved path.

11. The modular conveying belt of claim 7, wherein the belt is a straight-running belt.

\* \* \* \* \*